United States Patent
Muta

Patent Number: 5,132,158
Date of Patent: Jul. 21, 1992

[54] MAGNETIC RECORDING TAPE COMPRISING A POLYESTER FILM CONTAINING A PH BASIC FILLER

[75] Inventor: Kunihiko Muta, Saku, Japan

[73] Assignee: TDK Corporation, Tokyo, Japan

[21] Appl. No.: 397,743

[22] Filed: Aug. 23, 1989

[30] Foreign Application Priority Data

Sep. 8, 1988 [JP] Japan ................................ 63-223472

[51] Int. Cl.⁵ .............................................. G11B 5/00
[52] U.S. Cl. ............................... 428/143; 428/480; 428/693; 428/694; 428/900; 428/141; 428/701; 428/702
[58] Field of Search ............... 428/143, 141, 693, 694, 428/701, 900, 480, 145

[56] References Cited

U.S. PATENT DOCUMENTS

| | | | |
|---|---|---|---|
| 4,720,412 | 1/1988 | Katoh et al. | 428/141 |
| 4,803,121 | 2/1989 | Ryoke et al. | 428/329 |
| 4,818,581 | 4/1989 | Katoh et al. | 428/143 |

FOREIGN PATENT DOCUMENTS

55-155030 12/1980 Japan.

Primary Examiner—Paul J. Thibodeau
Assistant Examiner—Stevan A. Resan
Attorney, Agent, or Firm—Burgess, Ryan & Wayne

[57] ABSTRACT

The abrasion resistance of a nonmagnetic substrate of a polyester film of a magnetic recording tape can be improved without the use of a backcoating layers by adding a pH basic filler to the polyester film. The pH basic filler should exhibit a blue color when Bromothymol Blue, a basicity indicator, is adsorbed thereon.

4 Claims, 1 Drawing Sheet

MAGNETIC RECORDING TAPE COMPRISING A POLYESTER FILM CONTAINING A PH BASIC FILLER

BACKGROUND OF THE INVENTION

1. Field of the Invention

The present invention relates to a magnetic recording tape, more specifically, to a magnetic recording tape having a non-magnetic layer having a surface providing a superior abrasion resistance without a backcoating layer.

2. Description of the Related Art

As a non-magnetic substrate of a magnetic recording tape for audio equipment, video equipment, computers, etc., a polyester film, particularly a bi-axially expanded film of polyethylene terephthalate, is widely used due to its excellent properties such as tensile strength, tear strength, modulus of elasticity, transparency, resistance to chemicals, and heat resistance. Nevertheless, current requirements for longer recording times, reduction of size, densification, and a higher performance, mean that magnetic recording tapes must be made smoother and thinner, which will necessitate countermeasures to non-uniform tape running, winding disturbances, low strength, etc. As one such a measure, a backcoating layer of carbon black, graphite, etc., is formed on a surface (back surface) of a non-magnetic substrate, on the side opposite to a magnetic layer. This formation of a backcoating layer, however, is unpreferably from the viewpoint of cost and productivity, and thus magnetic recording tapes satisfying the above requirements without the need for the backcoating layer are required. In this regard, however, a magnetic recording tape without a backcoating layer has a particular problem in that an exposed surface of a non-magnetic substrate is easily damaged by guide pins, etc., of a cassette, which has an adverse affect on the appearance of the tape, and may cause a loss of recording information due to the presence of abraded powders adhered to the surface of the tape.

SUMMARY OF THE INVENTION

Therefore, the object of the invention is to provide a magnetic recording tape having an improved resistance to abrasion of a non-magnetic substrate without a backcoating layer.

Therefore, according to the present invention, there is provided a magnetic recording tape comprising a non-magnetic substrate of a polyester film containing a basic filler having a basicity such that a basic indicator, Bromothymol Blue, shows blue when adsorbed on the basic filler; and a magnetic layer formed on a surface of the non-magnetic substrate.

The inventors found that although some slight damage to a surface of a non-magnetic substrate occurred due to the shape of the guide pins, more serious damage occurred at points from which filler was detached, and further, found that this problem can be effectively solved by using as a main filler a basic filler compatible with the non-magnetic substrate.

The main fillers having the above specific basicity include alumina ($Al_2O_3$). Filler not having the above specific basicity do not provide a required abrasion resistance of the tape. The Bromothymol Blue is used in the present invention because this indicator changes color at a pH appropriate for determining whether a filler has a good or bad compatibility with the polyester film, and because this indicator can display a color by being adsorbed to the filler.

The non-magnetic substrate may contain an additional filler which does not have the basicity as stated above, such as silica, $CaCo_3$, kolinite, and $BaSO_4$. This additional filler is added to adjust the surface roughness to thereby improve the handling of the tape. In this respect, the additional filler preferably should be rough and have a specific surface area of 5 $m^2/g$ or less (BET). An example of a preferred combination of the above fillers is 60-100% by weight of alumina and 40-0% by weight of silica, more preferably 67-80% by weight of alumina and 20-33% by weight of silica.

The surface area of the filler is preferably 5 $m^2/g$ or more as the BET value. If the BET value is smaller than 5 $m^2/g$, the surface smoothness of the non-magnetic substrate is poor, which causes a marked deterioration of the electromagnetic conversion characteristic of the recording tape. The amount of the filler in the polyester film is preferably less than 5% by weight. If this amount is 5% by weight or more, the surface roughness of the non-magnetic substrate is undesirably increased and it becomes difficult to obtain a desired electromagnetic conversion characteristic. Further, with an increase of the amount of the basic filler in the polyester film, the abrasion resistance of the tape is increased accordingly, but the surface roughness of the non-magnetic substrate is also increased accordingly and it becomes difficult to obtain a desired electromagnetic conversion characteristic. Therefore, a reduction of the surface roughness of the non-magnetic substrate is necessary to obtain a desired electromagnetic conversion characteristic. In this respect, the average surface roughness of the nonmagnetic substrate is preferably not more than 26 nm.

The inventors also found that the abrasion resistance of the non-magnetic substrate is improved by an increase of the amount of a lubricant in the magnetic layer. This is considered to be due to the movement of the lubricant from the magnetic layer to the surface of the non-magnetic substrate, but too much lubricant in the magnetic layer causes an emission of the lubricant from the magnetic layer with a lapse of time, which causes contamination of the magnetic head and other disadvantages. According to experiments by the inventors, myristic acid and stearic acid are effective lubricants for improving the abrasion resistance, and most preferably, are included in amounts of 0.75-1.75 parts by weight of myristic acid and 0.75-1.75 parts by weight of stearic acid based on 100 parts by weight of the ferromagnetic particle in the magnetic layer.

The polyester film may be any conventional polyester film. A polyethylene terephthalate having 80 mole % or more of ethylene terephthalate units is preferred.

The polyester film may be formed by polymerizing terephthalic acid or an ester-forming derivative thereof, for example, dimethylterephthalate, and ethylene glycol as the main starting material, in a conventional manner. The formation of the polymer usually comprises a two step poymerization. The ester exchange catalyst used may be at least one of known compounds such as calcium compounds, manganese compounds, zinc compounds, and lithium compounds, etc. After a substantial completion of the ester exchange reaction or esterification, at least one of phosphorus compounds may be added as an agent for adjusting depositing particles or thermal stabilizer. The polycondensation catalyst used may be one or more of known antimony compounds, germanium compounds, titanium compounds, tim compounds, and cobalt compounds, etc. The inorgaic filler may be added in the form of ethylene glycol slurry to the starting material before the ester exchange reaction or esterification, or to the reaction product after these reactions.

For example, the film may be produced by fusing and expanding a starting material of a polymer of polyethylene terephtharate or a copolymer thereof with other ingredients, optionally blended with other polymers and additives. (see Japanese Examined Patent Publication No. 60-17339, published May 2, 1985)

The magnetic layer may comprise the ferromagnetic powder and a binder resin as the main starting material, The ferromagnetic particle may be selected from gamma-ferric oxide, cobalt-modified gamma-ferric oxide, chromium dioxide, metallic iron, and barium ferrite, etc.

The magnetic recording tape may be produced in a conventional manner: for example, coating a magnetic coating composition comprising a magnetic powder and additives dispersed in a binder on a substrate of polyester film at a predetermined thickness by a gravure type coating machine, etc.; magnetic field orientation; drying; calender or surface finishing; curing; and slitting into a predetermined width.

BRIEF DESCRIPTION OF THE DRAWINGS

The FIGURE shows the relationship between the electromagnetic conversion characteristic of a magnetic recording tape and the average surface roughness of a substrate film.

DESCRIPTION OF THE PREFERRED EMBODIMENTS

Figure 1:
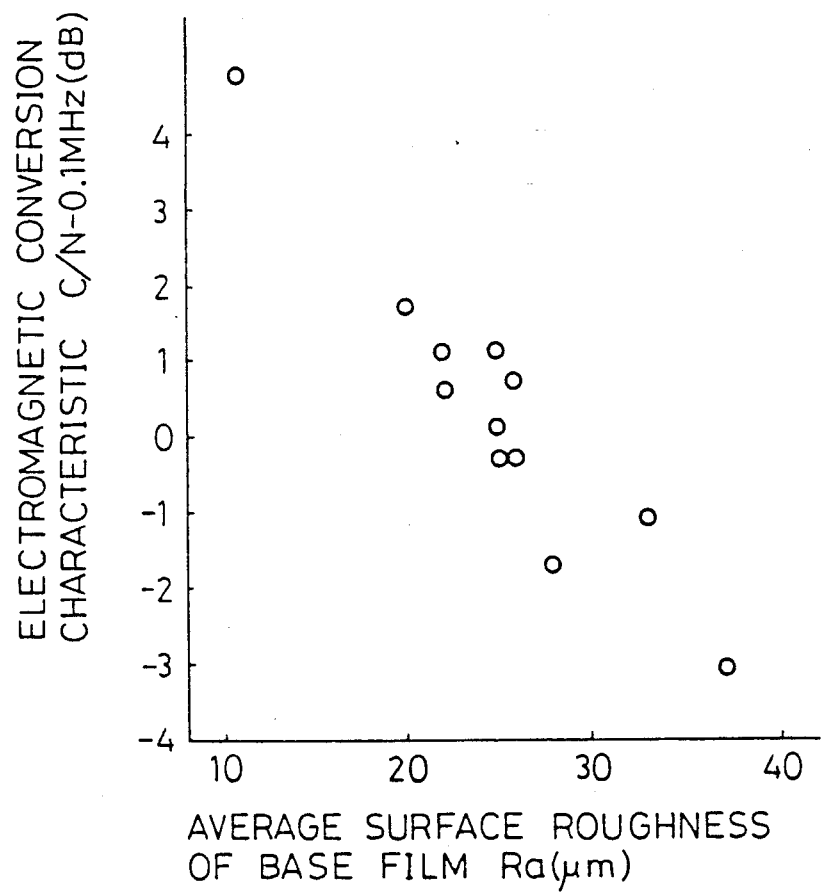

The present invention will be described in detail with reference to the following examples, which in no way limit the scope of the present invention.

In the following examples, the magnetic recording tapes were evaluated by the following tests.

Surface roughness

Using a surface configuration measurement device Surf-Corder FE-3F, produced by K.K. Kosaka Kenkyusho, the surface roughness was measured along the central line of a recording tape with a cut-off of 0.88 mm, a degree of magnification of 50000, and a length of measurement of 0.8 mm, and an average of the measured surface roughness was calculated and used as the surface roughness $R_a$. In this measurement the probe was a PUDJ provided by K.K. Kosaka Kenkyusho.

Degree of Basicity

First, 0.1 g of a filler to be measured was added to 5 ml of a benzene solution, at room temperature, and then 0.05 ml of the basicity indicator Bromothymol Blue was dropped into the solution. The solution was dispersed with a supersonic disperser for 20 minutes, allowed to stand for 24 hours, and the color then observed to determine the basicity.

Abrasion resistance

Using a device capable of rewinding a tape in the form of a pan-cake, a magnetic recording tape was driven under the following conditions with the non-magnetic substrate side (back side) surface of the tape facing guide pins for VHS made of chromium-plated brass. After driving the tape for 100 meters, the tape was unwound and a portion of the tape having a length of 1 m at a point 60 m from the starting point was cut and observed by the naked eye to estimate the amount of damage to the base side of the tape, using values of 0-5 points for 10 tapes, and an average thereof was calculated and used as the abrasion resistance value. A value of 4.0 or more at the point stated above indicates a good abrasion resistance.

| Tape feed speed | 4.2 m/sec |
| Tape tension | 20 g |
| Angle of tape turning at guide pin | 70° |
| Width of tape | 12.65 mm |

Electromagnetic conversion characteristic

Signals with a frequency of 4 MHz produced by a synthesizer 3325A (Hewlett Packard Company) were recorded on a tape using a video cassette recorder BR-7000 (Nippon Victor K.K.) and reproduced using the same video cassette recorder, the reproduced signals were analyzed by a spectrum analyzer 3585A (Hewlett Packard) to obtain a ratio between the outputs at 4 MHz and at 3.9 MHz. The reference tape used was a standard tape produced by TDK and the output ratio was shown as dB.

Lubricant Emission

A magnetic recording tape to be examined, having a length of 1 m, was allowed to stand at 0° C. for 3 hours, and the presence or absence of emitted lubricant was observed by the naked eye.

EXAMPLE 1 (COMPARISON)

First, 100 parts by weight of dimethyl phthalate, 75 parts by weight of ethylene glycol, and 0.07 parts by weight of calcium acetate monohydrate were heated in a reactor to conduct an ester exchange reaction. Then this reaction mixture, silica (BET value 8.7 m$^2$/g) as an inorganic filler, 9 parts by weight of an ethylene glycol slurry containing 0.06 parts of phosphoric acid, and 0.04 parts by weight of antimony trioxide were added and heated to effect polymerization. The amount of silica added was 1.0% by weight based on the weight of the final polymer. The polymer after polymerization was pelletized.

The polyester was fused and extruded, expanded in two directions, and then heat treated to obtain a polyester film having a thickness of 14 μm.

A magnetic coating material having the following composition was prepared for forming a magnetic layer.

Co-modified $\gamma$-Fe$_2$O$_3$ (BET 29 m/g)
Vinyl chloride-vinyl acetate copolymer
Polyurethane
a-Al$_2$O$_3$
Myristic acid
Stearic acid
Mixture of methyl-ethyl-ketone/methyl-isobutyl-ketone/toluene This material was thoroughly mixed and dispersed, and then coated on the above polyester film and dried, followed by surface finishing to obtain a magnetic layer. having a thickness of 4 μm. The resultant material was cut to form a magnetic recording tape having a width of ½ inch.

The surface roughness of the non-magnetic substrate, the abrasion resistance, the C/N ratio, the lubricant emission, and the degree of basicity of the magnetic recording tape and inorganic filler were determined, and the results are shown in Table 1.

EXAMPLES 2-9 (COMPARATIVE)

Magnetic recording tapes were prepared, in the same manner as in Example 1, except that the surface roughness of the polyester film and the kind of inorganic filler added were changed as shown in Table 1.

The abrasion resistance and so on of these tapes were determined by the same procedures as described above, and the results are shown in Table 1.

EXAMPLES 10-14

Magnetic recording tapes were prepared in the same manner as in Example 1, except that alumina was used as a main inorganic filler and the surface roughness of the polyester film was changed as shown in Table 2.

The abrasion resistance and so on of these tapes were determined in the manner as described above, and the results are shown in Table 2.

Also, as seen from Tables 1 and 2, magnetic recording tapes having an excellent abrasion resistance and electromagnetic conversion characteristic can be obtained by using alumina exhibiting a basicity at least as a main filler; the electromagnetic conversion characteristic is determined by an increase of the surface roughness; the abrasion resistance is increased with an increase of the amounts added of myristic acid and stearic acid, although an over addition of these acids causes an emission thereof.

I claim:

1. A magnetic recording tape, comprising: a non-magnetic substrate having a surface roughness not greater than 26 mm, comprising: a polyester film containing a basic filler having a basicity such that a basicity indicator comprising Bromothymol Blue shows blue when absorbed on the filter, wherein the filler is comprised of from 67%-80% by weight of alumina and 20%-33% by weight silica and the basic filler has a BET surface area value of at least 5m$^2$/g, the polyester film containing less than 5% by weight of the filler; and

TABLE 1

| Example | Bare film (BET: m$^2$/g)/ weight ratio | Surface roughness of base film Ra (mm) | Basicity H | Basicity OH | Amount added of aliphatic acids (parts) MA | Amount added of aliphatic acids (parts) SA | Abrasion resistance | C/N- 0.1 M | Emission |
|---|---|---|---|---|---|---|---|---|---|
| 1 | SiO$_2$ (8.7) | 26 | + + | − | 1.25 | 1.25 | 1 | +0.7 | good |
| 2 | SiO$_2$ (3.8) | 33 | + + | − | 1.25 | 1.25 · | 0 | −1.1 | good |
| 3 | CaCO$_3$ (5.4) | 26 | + | − | 1.25 | 1.25 | 1 | −0.3 | good |
| 4 | CaCO$_3$ (1.7) | 37 | + | − | 1.25 | 1.25 | 2 | −3.1 | good |
| 5 | TiO$_2$ (9.1) | 11 | + | − | 1.25 | 1.25 | 2.5 | +4.8 | good |
| 6 | TiO$_2$ (9.1) | 25 | + | − | 1.25 | 1.25 | 3.5 | −0.3 | good |
| 7 | TiO$_2$ (9.1) | 28 | + | − | 1.25 | 1.25 | 3.8 | −1.7 | good |
| 8 | SiO$_2$ (81.5) 80 SiO$_2$ (1.2) 20 | 18 | + + + + | − − | 1.25 | 1.25 | 2.0 | +0.3 | good |
| 9 | SiO$_2$ (81.5) 67 SiO$_2$ (1.2) 33 | 18 | + + + + | − − | 1.25 | 1.25 | 2.5 | +1.6 | good |

MA indicates myristic acid and SA stearic acid, the amounts thereof being based on 100 parts of magnetic particle.

TABLE 2

| Example | Bare film (BET: m$^2$/g)/ weight ratio | Surface roughness of base film Ra (mm) | basicity H | basicity OH | Amount added of aliphatic acids (parts) MA | Amount added of aliphatic acids (parts) SA | Abrasion resistance | C/N- 0.1 M | Emission |
|---|---|---|---|---|---|---|---|---|---|
| 10 | Al$_2$O$_3$ (85.9) 67 SiO$_2$ (1.2) 33 | 25 | − + + | + + − | 1.25 | 1.25 | 5.0 | +1.1 | good |
| 11 | Al$_2$O$_3$ (85.9) 80 CaCO$_3$ (0.8) 20 | 20 | − + | + + − | 1.25 | 1.25 | 4.8 | +1.7 | good |
| 12 | Al$_2$O$_3$ (30.4) 80 SiO$_2$ (1.0) 20 | 22 | − + | + + − | 1.25 | 1.25 | 4.7 | +1.1 | good |
| 13 | Al$_2$O$_3$ (5.0) 80 SiO$_2$ (1.0) 20 | 25 | − + | + + − | 1.25 | 1.25 | 4.8 | +0.1 | good |
| 14 | Al$_2$O$_3$ (5.0) | 22 | − | + + | 1.25 | 1.25 | 4.2 | +0.6 | good |

MA, SA: as in Table 1.

From Tables 1 and 2 it can be seen that the abrasion resistance of the polyester film was increased when alumina exhibiting a basicity was added as the filler. Note that, in Examples 1-9, the amounts added of the myristic acid and stearic acid were fixed to a preferred amount (1.25 parts by weight) and the surface roughness was varied.

The FIGURE shows the relationship between the electromagnetic conversion characteristic and the surface roughness of the base film (polyester film). As shown in the FIGURE, the electromagnetic conversion characteristic is in proportion to the surface roughness of the base film; for example, the surface roughness of the base film must be 26 mm or less to obtain an electromagnetic conversion characteristic of 0 dB or more.

a magnetic layer formed on a surface of the non-magnetic substrate.

2. A tape according to claim 1, wherein the magnetic layer comprises a ferromagnetic particles in a resin matrix, and further contains 0.75-1.75 parts by weight of myristic acid and 0.75-1.75 parts by weight of stearic acid, based on 100 parts by weight of the ferromagnetic particles, in the resin matrix.

3. A tape according to claim 1, wherein the ferromagnetic particles are selected from the group consisting of gamma-ferric oxide, cobalt-modified gamma-ferric oxide, chromium dioxide, metallic iron, and barium ferrite.

4. A tape according to claim 1, wherein the polyester is polyethylene terephthalate having 80 mole% or more of ethylene terephthalate unit.

* * * * *

UNITED STATES PATENT AND TRADEMARK OFFICE
CERTIFICATE OF CORRECTION

PATENT NO. : 5,132,158
DATED : July 21, 1992
INVENTOR(S) : Kunihiko Muta

It is certified that error appears in the above-identified patent and that said Letters Patent is hereby corrected as shown below:

Column 5, line 67 and column 6, line 14; "26 mm" should read --26 nm--

Column 5, table 1 and 2; "Ra(mm" should read --Ra(nm)--
On drawing sheet,
Figure 1, last line; "Ra(µm)" should read --Ra(nm)--

Signed and Sealed this

Third Day of May, 1994

Attest:

BRUCE LEHMAN

Attesting Officer

Commissioner of Patents and Trademarks